Sept. 8, 1959  E. R. ANDERSON  2,903,031
MANUALLY OPERABLE PIT GRIPPER FOR FREESTONE
AND CLINGSTONE FRUITS
Filed Nov. 15, 1956  2 Sheets-Sheet 1
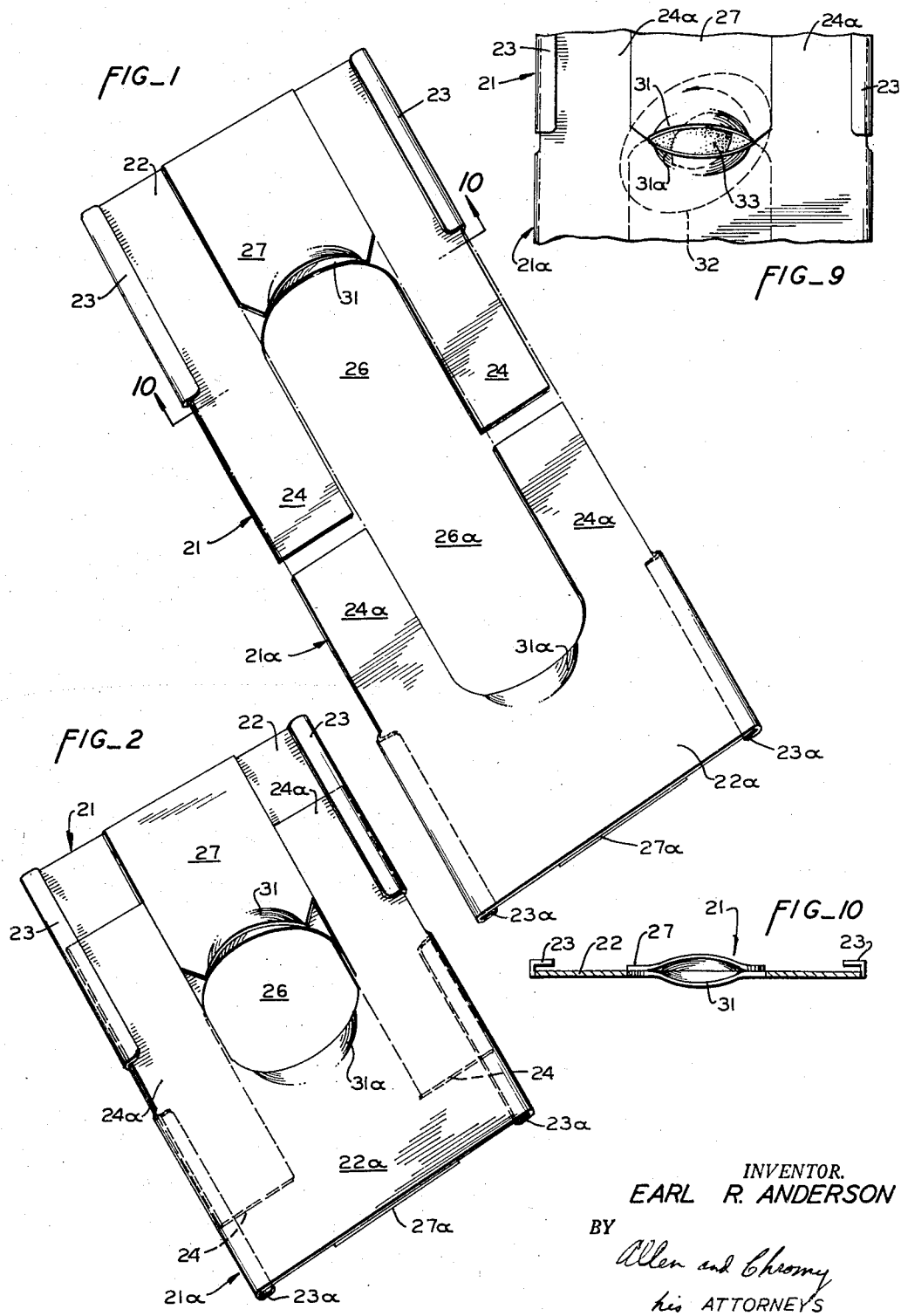
INVENTOR.
EARL R. ANDERSON
BY
*Allen and Chromy*
his ATTORNEYS

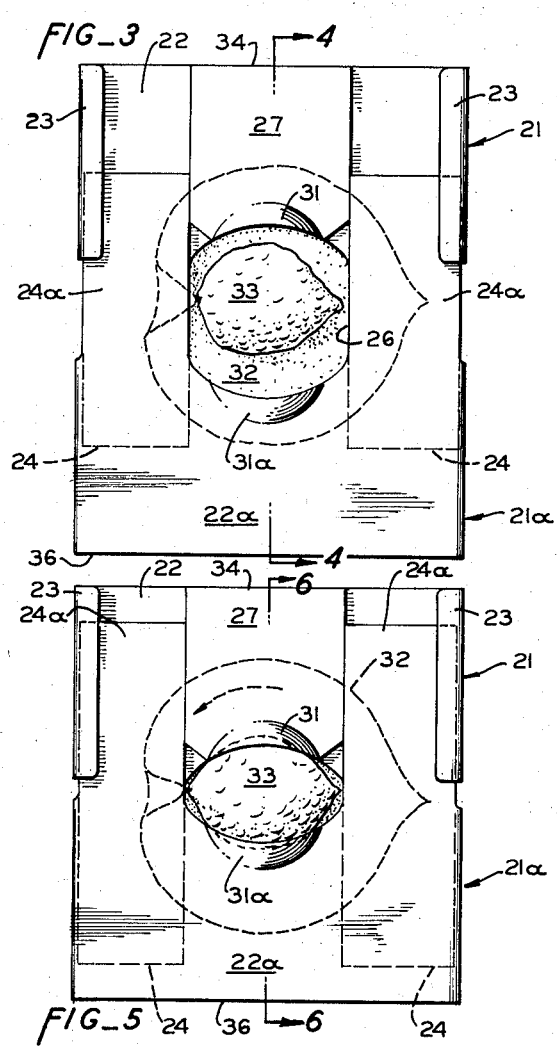

United States Patent Office 2,903,031
Patented Sept. 8, 1959

2,903,031

MANUALLY OPERABLE PIT GRIPPER FOR FREE-STONE AND CLINGSTONE FRUITS

Earl R. Anderson, Campbell, Calif.

Application November 15, 1956, Serial No. 622,348

3 Claims. (Cl. 146—31)

The present invention relates to the pitting of drupaceous fruits and is concerned more particularly with an improved pit gripper whereby the pit left in a half fruit after removal of one-half of the fruit can be gripped in one hand while the half of the fruit thereon is held in the other hand and the pit separated from the half fruit by relative movement of the pit gripper and the pit thereby and the half fruit.

In the hand pitting of drupaceous fruit such as free stone peaches, prunes, plums and certain types of clingstone fruit such as plums for example it is customary to cut a thin strip of flesh from the fruit in the plane of the suture thereof by the use of a knife having twin blades spaced apart for the desired thickness as disclosed for example in the patent to Duncan 1,441,490. This removal of the thin segment of flesh serves to separate the two halves of fruit to be removed, as well as to remove certain undesirable portions of the flesh such as the tip at the blossom end and a portion thereof at the stem end. After this separation the two fruit halves are grasped in the two hands of the operator and by a twisting action one half fruit is separated from the pit, the other fruit half still retaining the pit. In accordance with the instant invention a pit gripper is provided for manual use to grip the pit and to enable easy separation of the half fruit and the pit.

Accordingly it is a principal object of the invention to provide a manually operable pit gripper, or pit holder so as to be able to restrain the pit from rotation or to rotate the pit in a desired direction by manipulation of the pit gripper.

It is another object of the invention to provide a pit holding means having pit engaging sockets defining an orifice disposed centrally of the pit gripper and providing flesh engaging surfaces about the orifice.

Another object of the invention is to provide a pit gripper of the above character which is adapted to be formed in a simple fashion by known production methods, and which for example is readily adaptable to the use of punch press methods.

A further object of the invention is to provide a pit gripper of the above character in which the pit receiving opening is automatically adjusted, by the act of being held in the hand, to accommodate the size of the orifice to the size of the pit.

Still another object of the invention is to provide a pit gripper or holder comprising substantially planar surfaces in the work area of the device, these surfaces surrounding a pit receiving opening defined at least in part by opposed pit receiving sockets.

Other objects and advantages of the invention will be apparent from the following description of a preferred embodiment thereof, as illustrated in the accompanying drawings, in which:

Figure 1 is a perspective view of the two identical halves of the pit gripper in a separated condition.

Figure 2 is a perspective view of the pit gripper with its two halves connected and ready for operation.

Figure 3 is an elevational view of the pit gripper showing a peach half containing a pit in operative relation to the gripper.

Figure 4 is a sectional view taken in a plane indicated by the line 4—4 in Figure 3.

Figure 5 is a view similar to Figure 3 but showing the pit gripper in closed condition and in pit holding or grasping relation.

Figure 6 is a sectional view taken in a plane indicated by the line 6—6 in Figure 5.

Figure 7 is an elevational view of one part of the identical halves of the pit gripper.

Figure 8 is an elevational view of another part of the identical halves of the pit gripper.

Figure 9 is a fragmentary view similar to Figure 5 illustrating the operation of the pit holder or gripper where the pit is not actually gripped but is encompassed and held by the sockets.

Figure 10 is a sectional view taken in a plane indicated by the line 10—10 in Figure 1.

The pit gripper or holder of the instant invention comprises generally two identical members which are telescopically or slidably engaged and which provide on the two planar side surfaces thereof abutments for engagement by the flesh of a fruit half, surrounding a more or less central aperture or opening which receives the pit and is provided with socket means for encompassing and holding the pit when closed. Desirably the two halves of the pit gripper by their telescopic movement under manual pressure provide an adjustment of the central orifice to the size of the pit so that one pit gripper can be employed throughout substantially a complete range of fruit and pit sizes. Thus one gripper is useful in preparing any kind of fruit in which the flesh can be separated from the pit by relative twisting movement in preparing the fruit for a canning or other operation.

Referring to Figures 1, 2, 7, 8 and 10 the pit gripper of the instant invention comprises identical halves 21 and 21a, formed of sheet metal such as brass for example, and adapted to be telescopically or slidably engaged. Each of the sheet like members 21 is formed with a plate like body portion 22 having its side edges or extensions bent over at 23 to provide opposed guideways or recessed side edges. From the body portion 22 opposed side extensions 24 project at either side of a central recess 26. Centrally of the body portion 22 there is provided a central plate 27 which is secured to the body 22 in flush engagement therewith as by silver soldering or brazing. This plate 27 is of a width to fit into a central recess 26a of the other half of the body 22a between the extensions 24a thereof. The plate 27 is of the same thickness as the body 22.

A socket is formed in each half of the pit gripper at the respective arcuate ends of the recesses 26 and 26a, and for this purpose the body 22 and the plate 27 are formed in a stamping operation, to be placed out of the normal plane of the pit gripper in diverging relation to provide a pit gripping or holding socket 31 of substantially V-shaped cross-section. It will be noted that the edges of this socket 31 and all the adjacent surfaces of metal are continuous and smooth so as to be able to move into and against the flesh of the fruit without producing tearing or marking.

The operation of the pit gripper is illustrated in Figures 3 through 6 in connection with a peach half 32 for example having a peach pit 33 still adhered thereto. As illustrated the peach half 32 is placed with its cut surfaces against the planar sides of the gripper and with the peach 33 projecting into the orifice formed by the recesses 26 and 26a and defined in part by the opposed sockets 31 and 31a. In this condition of the parts the hand of the operator is placed over the pit gripper with the fingers overlapping one edge 34 thereof and with the thumb and a part of the palm overlapping the opposite edge 36 so that by closing movement of the hand, the pit gripper can be adjusted from the position shown in Figure 3 to that shown in Figure 5 where the pit is gripped by the socket members 31 and 31a. In this condition of the parts the operator's other hand grips the fruit half and a relative twisting movement is performed between the two hands resulting in twisting separation of the fruit half and the pit.

As illustrated for example in Figure 9 the sockets 31 and 31a can serve also as a pit holder or restrainer even when actually not positively gripping a pit, for example when a small prune pit and the twisting separation of the fruit half and the pit can still be effected.

While I have shown and described a preferred embodiment of the invention, it will be apparent that the invention is capable of variation and modification from the form shown so that the scope thereof should be limited only by the proper scope of the claims appended hereto.

I claim:

1. A manually held and operable pit gripper for use in pitting fruits, consisting of a pair of identical slidably engaged pit gripping members, each member having opposed guideways for slidably receiving the other member, each member including means defining a recess therein between a pair of oppositely spaced apart extensions projecting in a direction parallel to said guideways and defining a slot having one end closed, each member including a pit receiving socket at the closed end of said slot, a plate secured to each said member in flat abutting relation adjacent the closed end of said recess and disposed between the extensions of the other member and being of substantially the same thickness to provide a peach supporting surface lying substantially in a plane, said members defining an adjustable pit receiving opening operable to receive the pit in a half fruit when the cut surface of a half fruit is presented to and engaged with the surfaces of the members.

2. A pit gripper as recited in claim 1 in which said members have opposite edge portions providing a hand grip for operation of said members to adjust said opening and effect gripping of a pit.

3. A pit gripper as recited in claim 1 in which said members are of sheet or plate construction and said guideways comprise formed edge portions.

References Cited in the file of this patent

UNITED STATES PATENTS

| | | |
|---|---|---|
| 293,841 | Alison | Feb. 19, 1884 |
| 1,256,439 | Clark | Feb. 12, 1918 |
| 2,196,617 | Thornton | Apr. 9, 1940 |
| 2,272,415 | McLauchlan | Feb. 10, 1942 |
| 2,826,227 | Perrelli et al. | Mar. 11, 1958 |